United States Patent [19]
Beckert et al.

[11] Patent Number: 6,131,051
[45] Date of Patent: Oct. 10, 2000

[54] INTERFACE BETWEEN A BASE MODULE AND A DETACHABLE FACEPLATE IN AN IN-DASH AUTOMOTIVE ACCESSORY

[75] Inventors: Richard D. Beckert, Lake Stevens; Alec Barker, Redmond; Mark M. Moeller, Des Moines, all of Wash.

[73] Assignee: Microsoft Corporation, Redmond, Wash.

[21] Appl. No.: 09/003,056

[22] Filed: Jan. 5, 1998

[51] Int. Cl.[7] .................................................. G05B 15/00
[52] U.S. Cl. ............................... 700/83; 700/17; 700/86; 700/85; 250/368; 250/366; 245/428; 245/429; 307/10.1; 307/10.2
[58] Field of Search .................................. 700/83, 85–86, 700/17, 65; 250/368, 366, 367, 369; 345/427, 428, 429, 430; 307/10.1–10.2

[56] References Cited

U.S. PATENT DOCUMENTS

| | | |
|---|---|---|
| 4,068,175 | 1/1978 | Maniaci ................................. 325/352 |
| 4,078,182 | 3/1978 | Arney et al. ......................... 307/10 AT |
| 4,365,280 | 12/1982 | Crosetti et al. .......................... 360/137 |
| 4,895,326 | 1/1990 | Nimpoeno et al. .................... 248/27.1 |
| 4,942,302 | 7/1990 | Koechner ................................ 250/368 |
| 5,613,051 | 3/1997 | Iodice et al. ............................ 345/428 |
| 5,637,928 | 6/1997 | Nakajima et al. ..................... 307/10.2 |
| 5,646,602 | 7/1997 | Gertz et al. ......................... 340/825.25 |
| 5,870,018 | 2/1999 | Person et al. ........................... 340/426 |
| 5,895,016 | 4/1999 | Blackburn .............................. 248/27.1 |

*Primary Examiner*—Paul P. Gordon
*Assistant Examiner*—Ramesh Patel
*Attorney, Agent, or Firm*—Lee & Hayes, PLLC

[57] ABSTRACT

Described herein is an in-dash automotive accessory having a detachable faceplate with a keypad and a medium resolution color graphics display. The graphic display has a rectangular array of addressable pixels. A serial interface is used to transfer data to and from the faceplate. Although the serial interface has a clock rate of only 7.5 MHz, it allows refreshing of a 64×256 pixel display panel at a 70 Hz pixel refresh rate. This is accomplished through a variety of techniques, including the use of efficient command code protocol, by packing or compressing pixel intensity data, and by double buffering incoming control messages.

38 Claims, 8 Drawing Sheets

INTERFACE BETWEEN A BASE MODULE AND A DETACHABLE FACEPLATE IN AN IN-DASH AUTOMOTIVE ACCESSORY

TECHNICAL FIELD

This invention relates to automotive accessories having bit-mapped graphical display panels, and to methods of communicating between a base module and a detachable faceplate of such an automotive accessory.

BACKGROUND OF THE INVENTION

It is quite common for in-dash automotive accessories, such as radios, CD players, and similar electronic components, to have detachable faceplates. Removing the faceplate when an automobile is unattended tends to discourage theft of the remaining components: removing the faceplate not only reduces the commercial value of the remaining components, but also reduces the likelihood that a potential thief will even notice the components.

Detachable faceplates require an effective electrical interface between the faceplate and the corresponding base module. Design goals for such an interface typically reflect a need for a small, reliable connector, utilizing as few signals as possible. Most designs also attempt to minimize electromagnetic interference.

In the past, this has not been a difficult design task since communications requirements between base modules and their corresponding faceplates have been modest. However, the increasing integration of computer functions into automobile accessories is likely to complicate the task of designing electrical interfaces between these components. Particularly, it is likely that removable faceplates will perform more complex functions than in the past, requiring sophisticated and high-speed data communications.

The inventors of the present invention were faced with just such a situation, in which a proposed faceplate would incorporate a color, pixel-addressable display panel having a size of 64×256 pixels. It was desired to enable a pixel refresh rate of at least 50 or 60 Hz, while minimizing electromagnetic emissions by avoiding high-frequency signals.

The conventional way of accomplishing the design objectives would have been to provide a parallel communications interface between the base module and the faceplate, so that pixel data could have been transferred in byte-size (or larger) words. This would have avoided the need for a high clock frequency, thereby reducing electromagnetic emissions.

Instead, however, the inventors devised a serial interface that allows refreshing of a 64×256 pixel display panel at a rate of up to 70 Hz. Despite such a high refresh rate, the serial interface transfers data at no more than 7.5 Mbits/sec. This transfer rate is low enough to avoid generation of any significant electromagnetic interference. Furthermore, the serial interface can be implemented with a minimum of signal lines so that a relatively inexpensive connector can be used.

SUMMARY OF THE INVENTION

In accordance with the invention, a base module communicates with a mating faceplate through a synchronous serial interface. The serial interface includes a serial transmit line, a serial receive line, a clock line, and a synchronize line. The clock line operates at a frequency of 7.5 MHz. The invention includes a particular low-level communications protocol that allows different types of data to be transferred.

Data communications are initiated by the base module, which sends control messages to the faceplate. A variety of commands are implemented through the control messages, allowing the base module to write pixel data to the bit-mapped display panel of the faceplate and to read data from the matrix keypad of the faceplate. In order to reduce communications overhead, one type of control message specifies an address in the bit-mapped memory. Subsequent control messages write pixel data to sequential bit-mapped memory locations without the need for explicitly specifying new addresses.

To further optimize the use of available bandwidth, the faceplate uses a double buffering scheme so that a received control message can be processed even while the next control message is being received. Furthermore, pixel data within each control message is packed or compressed. The faceplate has logic for uncompressing or otherwise formatting the pixel data appropriately for the display controller associated with the faceplate's display panel. The faceplate logic is also configured to generate multiple bus cycles to the display controller in order to transfer the pixel data contained in a single control message.

DETAILED DESCRIPTION

General Configuration

Figure 1:
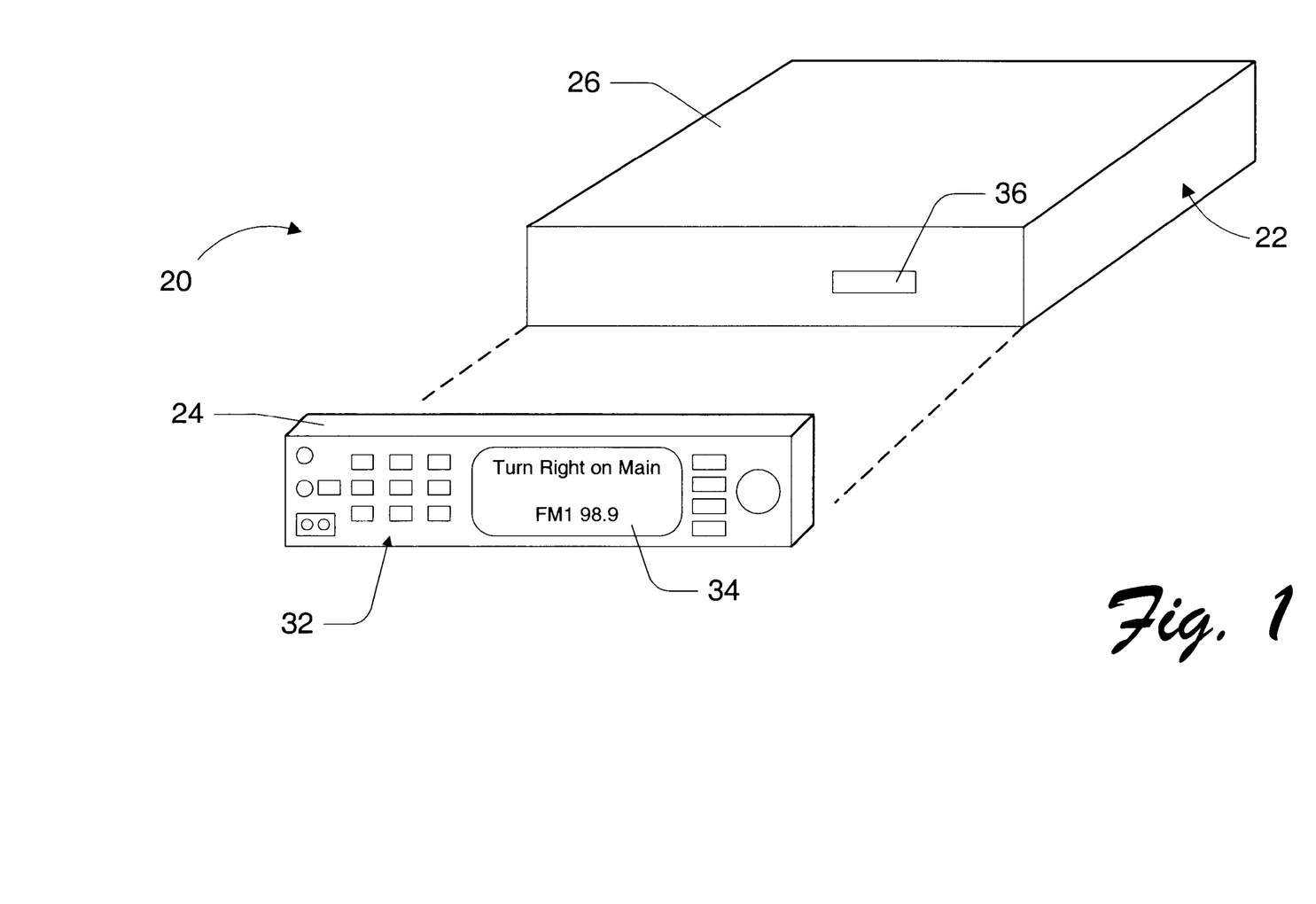
FIG. 1 is a conceptual drawing of an in-dash automotive accessory having a detachable faceplate in accordance with the invention.

FIG. 1 shows an in-dash automotive accessory 20 in accordance with one embodiment of the invention. In this embodiment, the automotive accessory is a vehicle computer system that includes a variety of different elements such as a security subsystem, a navigation subsystem, and an entertainment subsystem. In other embodiments, the accessory might have more limited functionality. It might comprise, for example, a car radio, cassette player, CD player, or similar device.

Automotive accessory 20 has a base module 22 and a detachable faceplate 24. Base module 22 includes a housing 26 that is sized to be mounted in a vehicle dashboard, similar to a conventional car stereo. Preferably, housing 26 has a form factor of a single DIN (Deutsche Industry Normen). The base module could alternatively be housed in a 2 DIN unit or other special form factor for an OEM.

In the described embodiment, base module 22 is a computer that runs a multi-tasking operating system to support multiple applications. One preferred operating system is a Windows brand operating system sold by Microsoft Corporation, such as Windows 95, Windows CE, Windows NT or other derivative versions of the Windows family of operating systems. The computer and operating system are configured to support after-market peripherals including both hardware and software components.

Faceplate 24 has a keypad 32 and a graphical display surface or element 34. Keypad 32 is a conventional matrix keypad having column driver lines and row scan lines. The keypad can be configured to produce an interrupt signal in response to a key press. To determine which key is pressed, column lines are sequentially activated while monitoring the row lines. This process is referred to as "scanning."

Display element 34 preferably includes a back-lit LCD having a rectangular array of pixels that are selectable or addressable for illumination or display. The display element is a medium-resolution, bit-mapped display system having at least 10,000 pixels. The operating system of base module 22 interacts with faceplate keypad 32 and faceplate display 34 as peripheral devices when the faceplate is attached to the base module.

In the described embodiment, the array of pixels has a size of at least 64 (vertical) by 256 (horizontal) pixels. Each pixel has three color components (Red, Green, and Blue). Each color component can have one of two values, representing on and off, respectively. Thus, each pixel can display one of eight different composite colors.

Faceplate 24 attaches to base module 22 through mechanical means not shown, and by way of an electrical connector 36. In the described embodiment, the electrical connector implements an electrical interface between the faceplate and the base module. This electrical interface has four primary signal lines, the functions of which will be described below. In addition, the electrical interface might include other lines for functions not related directly to this invention, such as a line for generating interrupts in response to keypad activations, a line for generating interrupts in response to faceplate removal or attachment, and lines relating to infrared communications that might be facilitated by faceplate components such as infrared transmitters and receivers. Furthermore, the electrical interface includes connections for power.

The electrical interface described herein is used to communicate data between the base module and the faceplate using a serial-bit transmission protocol. Generally, the faceplate receives control messages from the base module through the interface, and responds to the control messages either by returning data or by taking some action within the faceplate. For example, control messages can be used to read keypad data from the faceplate or to write display pixel data to the faceplate.

Although FIG. 1 and the following block diagrams show the components of automotive accessory 20 that are most pertinent to the invention, automotive accessory 20 potentially supports a number of components and features that are not discussed herein. For more detail regarding such features refer to a U.S. patent application Ser. No. 08/564,586, entitled "Vehicle Computer System," which was filed Nov. 29, 1995, and is assigned to Microsoft Corporation. This application is hereby incorporated by reference.

Base Module

Figure 2:
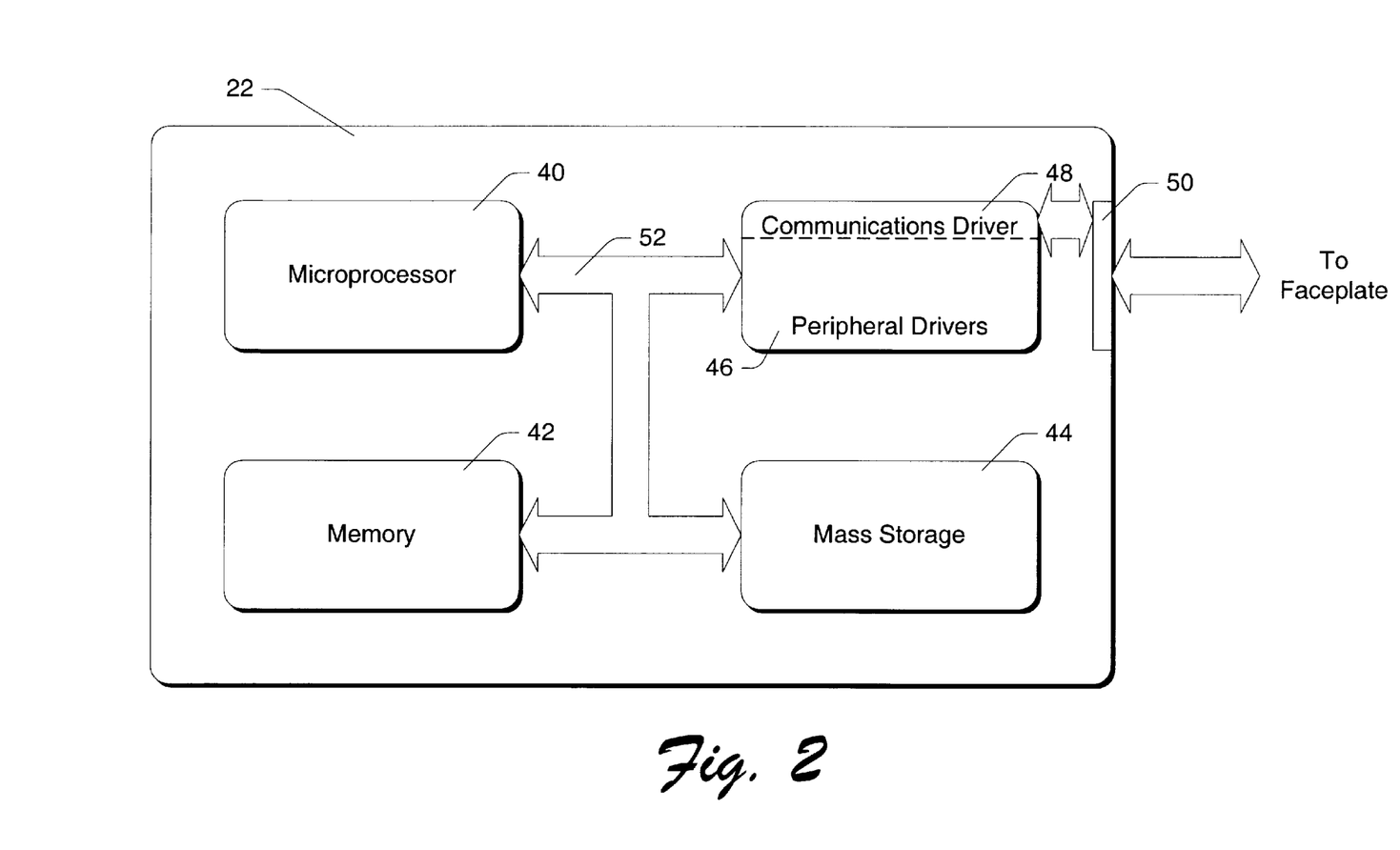
FIG. 2 is a simplified block diagram of a base module shown in FIG. 1.

FIG. 2 is a simplified block diagram showing pertinent components of base module 22. The base module has a conventional computer architecture, including a microprocessor 40, associated addressable memory 42 (including non-volatile memory and high-speed volatile memory), optional mass storage 44, and peripheral drivers 46. One peripheral driver, labeled 48 in FIG. 2, is associated with a first data or communications interface 50 that provides serial communications to and from the faceplate. The nature of first data interface 50 will be explained in more detail below. Other components, not shown, provide different types of entertainment functionality as described in the patent application cited above. The various components communicate internally through a parallel data bus 52.

Faceplate

Figure 3:
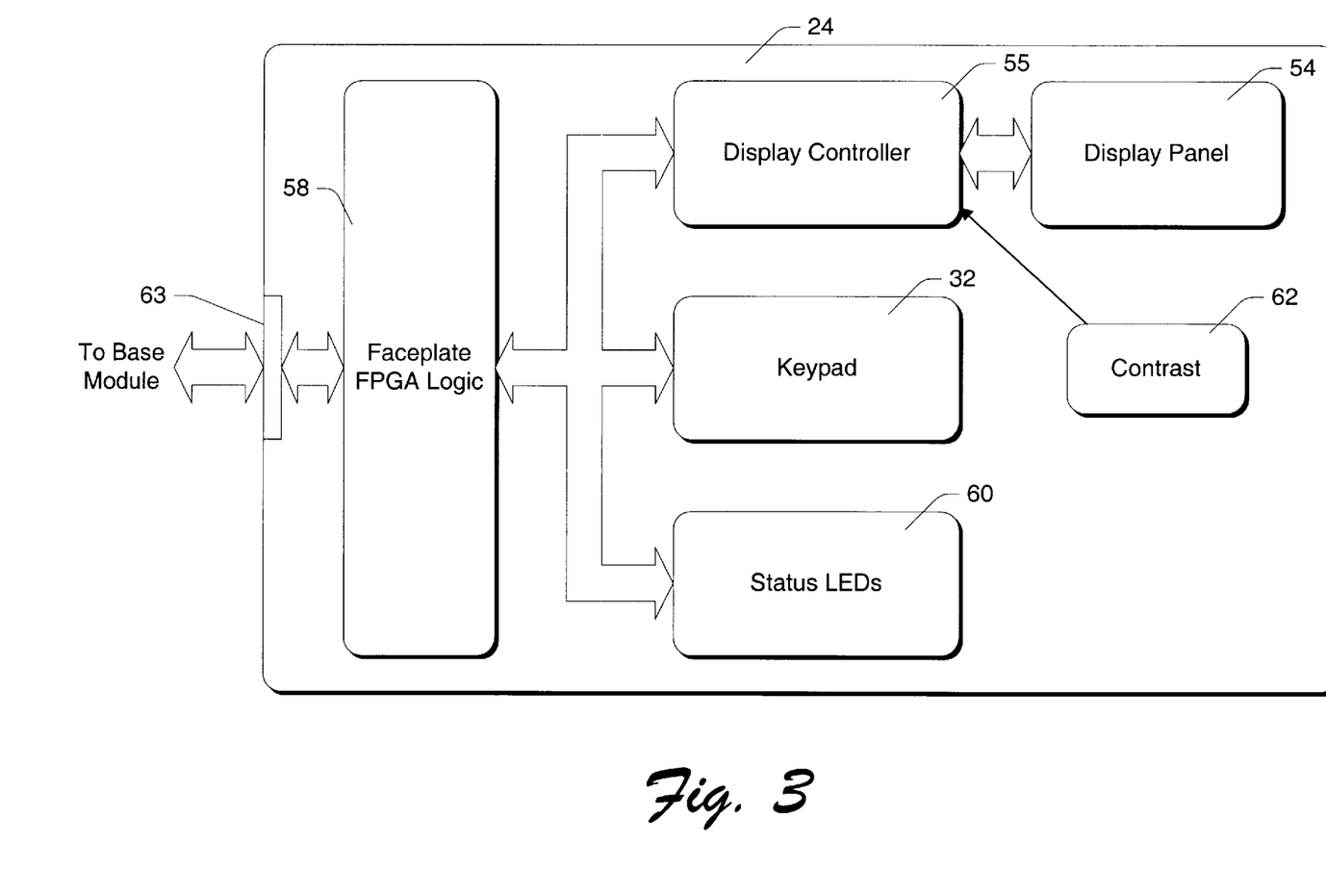
FIG. 3 is a simplified block diagram of a detachable faceplate shown in FIG. 1.

FIG. 3 is a simplified block diagram showing pertinent components of faceplate 24. Faceplate 24 incorporates display element 34 in the form of a display panel 54 and an associated electronic display controller 55. A variety of different display controllers can be used. In the described embodiment, the display controller is commercially available from S-MOS Systems, Inc., having a part number of SED1352FOB. The display controller drives the electrical lines of the display panel. The display controller includes or works in conjunction with addressable, bit-mapped memory (not shown) that stores pixel data. Addressable locations in the bit-mapped memory correspond to specific pixels of display panel 54.

The display controller used in the exemplary embodiment is configured to specify four shades for each of three available color components (red, blue, and green). Thus, a particular pixel is represented within controller 55 and its bit-mapped memory as a six-bit uncompressed pixel intensity word: two bits for each of the three color components. Pixel intensity words corresponding to sequential pixels in display panel 54 (from left to right and from top to bottom) are packed in the bit-mapped memory starting at a base address and continuing with sequential addresses.

Faceplate 24 further includes logic 58, a plurality of status-indicating LEDs (light emitting diodes) or other discrete indicators 60, and a contrast adjustment potentiometer 62. Faceplate logic 58 is implemented by an FPGA (field programmable gate array) integrated circuit. Faceplate logic 58 is connected through appropriate electrical interfaces to the row and column lines of keypad 32, to status LEDs 60, and to display controller 55.

Faceplate 24 has a second data interface 63 for communications between base module 22 and faceplate 24, corresponding to first data interface 50 of base module 22. Data interface 63 is implemented by faceplate FPGA logic 58.

Data Communications Interface

Figures 4, 5:
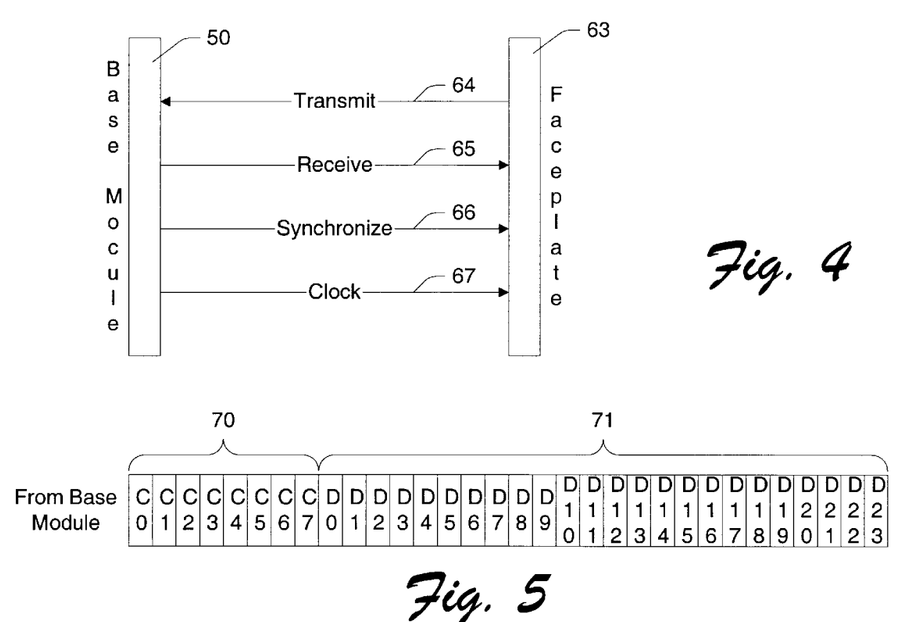
FIG. 4 illustrates an electrical and data communications interface between the base module and faceplate of FIG. 1.
FIGS. 5 and 6 illustrate command protocols utilized between the base module and faceplate of FIG. 1.

FIG. 4 shows the electrical signal lines that form data interfaces 50 and 63 between base module 22 and faceplate 24. For clarity, the signal lines are described with respect to their functions relative to faceplate 24. Thus, when a given line is described as a transmit line, it should be recognized that the faceplate is configured to transmit data over the line and that the base module is configured to receive data from the line.

The functions of the electrical signal lines define both of data interfaces 50 and 63. The data interfaces are implemented to transmit and receive data in a serial-bit format, in which individual bits are transmitted sequentially at a specified rate. The data interfaces include four lines: a serial transmit line 64, a serial receive line 65, a synchronize line 66, and a clock line 67. Serial receive line 65, synchronize line 66, and clock line 67 are sourced by the base module, while serial transmit line 64 is sourced by the faceplate. These lines form a synchronous, bidirectional communications medium that allows data bits to be transmitted serially over respective signal lines. Specifically, bits are transmitted sequentially from the base module to the faceplate over serial receive line 65. Bits are transmitted sequentially from the faceplate to the base module over serial transmit line 64. Bits on the receive line are clocked by or synchronized to the falling edge of a clock signal that is transmitted on clock line 67 by base module 22 whereas bits on the transmit line are clocked by the rising edge of the clock signal. In the exemplary embodiment described herein, the clock signal has a frequency of 7.5 MHz, resulting in a bit transfer rate of 7.5 Mbits/sec. Synchronize line 66 is used to signal the beginning of a control message transmission from base module 22. Base module 22 initiates all data communications.

Data Protocols

FIGS. 5–8 illustrate command protocols that are advantageously used to communicate between base module 22 and faceplate 24. A write command protocol is used when providing data from base module 22 to faceplate 24. The use of the write command protocol is to provide display element pixel data to the faceplate or to write to any other faceplate registers. A read command protocol is used when the base module retrieves data from the faceplate. The primary use of the read command protocol is to retrieve keystroke data. Both protocols utilize control messages that the base module sends to the faceplate. Each control message includes an 8-bit command control code. Control messages used to implement write commands also include a 24-bit data word.

FIG. 5 illustrates the bit format of a control message, sent from the base module to the faceplate, that implements a write command. The control message begins with an 8-bit control code 70 (bits C0–C7). The control code is followed by a data word 71 having 24 bits (bits D0–D23).

Figure 6:
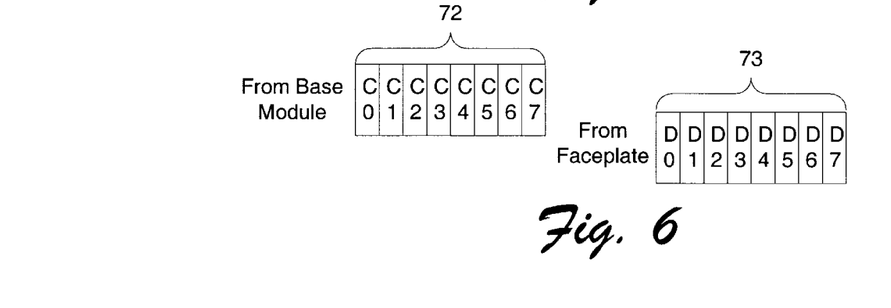

FIG. 6 illustrates the format of a control message that implements a read command, and the corresponding response from the faceplate. The control message begins with an 8-bit control code 72 (bits C0–C7). In this case, however, the control message does not include further data. In response to receiving the control code, the faceplate returns an 8-bit data word 73 (bits D0–D7).

The exemplary embodiment of the invention defines a plurality of command control codes that designate different types of read and write operations. A preferred set of command control codes will be described later in this document.

Figure 7:
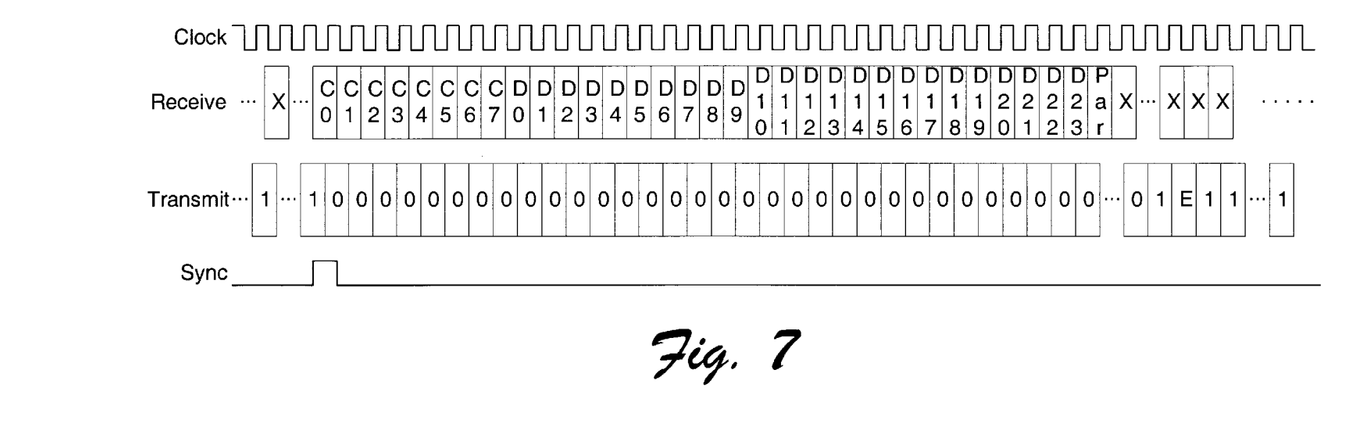
FIGS. 7 and 8 are timing diagrams specifying write and read command protocols, respectively, in conjunction with the electrical and data communications interface shown in FIG. 4.
Figure 8:
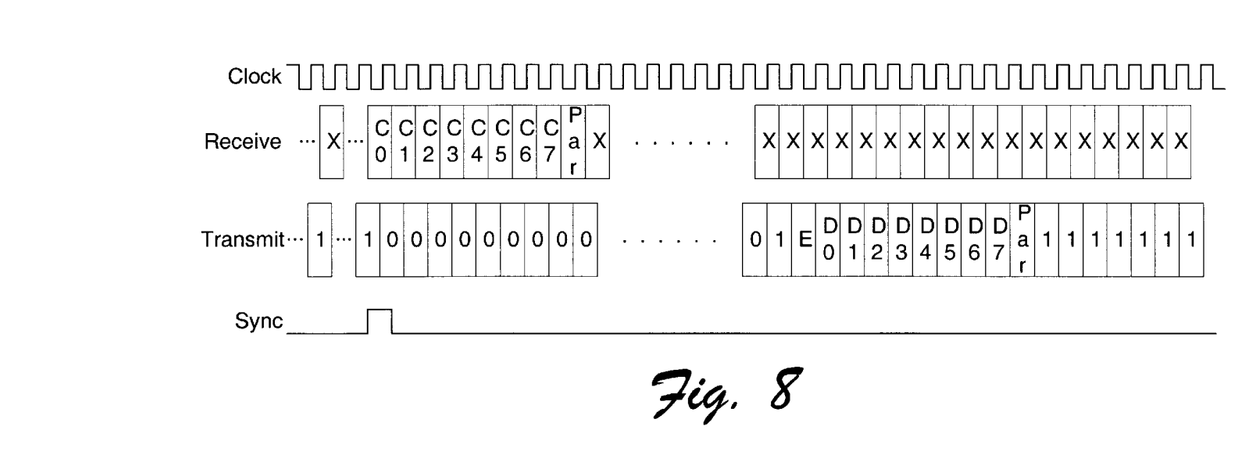

FIGS. 7 and 8 are timing diagrams showing signals carried by each of the four data interface lines during data transfer. FIG. 7 shows the protocol used for a write command, in which base module 22 writes data to faceplate 24. During a write command, the base module sends the 8-bit write command code (bits C0–C7) to the faceplate, followed by 24 data bits (D0–D23). "Don't care" bits are indicated by the label "X". Prior to and between commands, faceplate 24 sends a continuous series of "1" or "true" bits on the serial transmit line by maintaining the line at a high level, thereby indicating readiness to receive and respond to a command. Base module 22 maintains the synchronize line at a logic low level. To initiate a command sequence, the base module sends a synchronize signal by raising the synchronize line to logic high for one clock period. The rising edge of this synchronize signal coincides with a falling edge of the clock signal carried on the clock line. Simultaneously, base module 22 begins sending command code bits C0–C7, followed immediately by data bits D0–D23 and a parity bit (labeled "Par"). These bits transition on the falling edges of the clock signal and are sampled by the faceplate logic on the rising edge of the clock signal. As soon as the faceplate detects the synchronize signal, the faceplate begins sending "0" or "false" bits on the transmit line to indicate that it is receiving control message data. After receiving the parity bit, the faceplate continues to send "0" bits until it checks the received data against the received parity bit. It then sends a single "1" bit on the transmit line, followed by a single error-indicating bit. The error-indicating bit is true if all bits were received successfully. The error-indicating bit is false if there was a parity error. After this sequence, faceplate 22 again sends a continuous sequence of "1" bits on the transmit line to indicate readiness to receive another command.

FIG. 8 shows the protocol used in the exemplary embodiment of the invention for a read command, in which base module 22 sends a control message to faceplate 24 and receives data in response. During a read command, the base module sends an 8-bit read command code to the faceplate (bits C0–C7), and the faceplate responds by returning 8 bits of data (D0–D7). To initiate the read command sequence, the base module sends a synchronize signal by raising the synchronize line to a logical true level for one clock period. The rising edge of this synchronize signal coincides with a falling edge of the clock signal carried on the clock line. Simultaneously, base module 22 begins sending command code bits C0–C7, followed immediately by a parity bit (labeled "Par"). As soon as the faceplate detects the synchronize signal, the faceplate begins sending "0" bits on the transmit line to indicate that it is receiving control message data. After receiving the parity bit, the faceplate continues to send "0" bits until it checks the received data against the received parity bit. It then sends a single "1" bit on the transmit line, followed by a single error-indicating bit. The error-indicating bit is true if all bits were received successfully. The error-indicating bit is false if there was a parity error. The faceplate then sends data bits D0 through D7 on the serial transmit line, followed by a parity bit. After this sequence, faceplate 22 again sends a continuous sequence of "1" bits on the transmit line to indicate readiness to receive another command.

Figure 9:
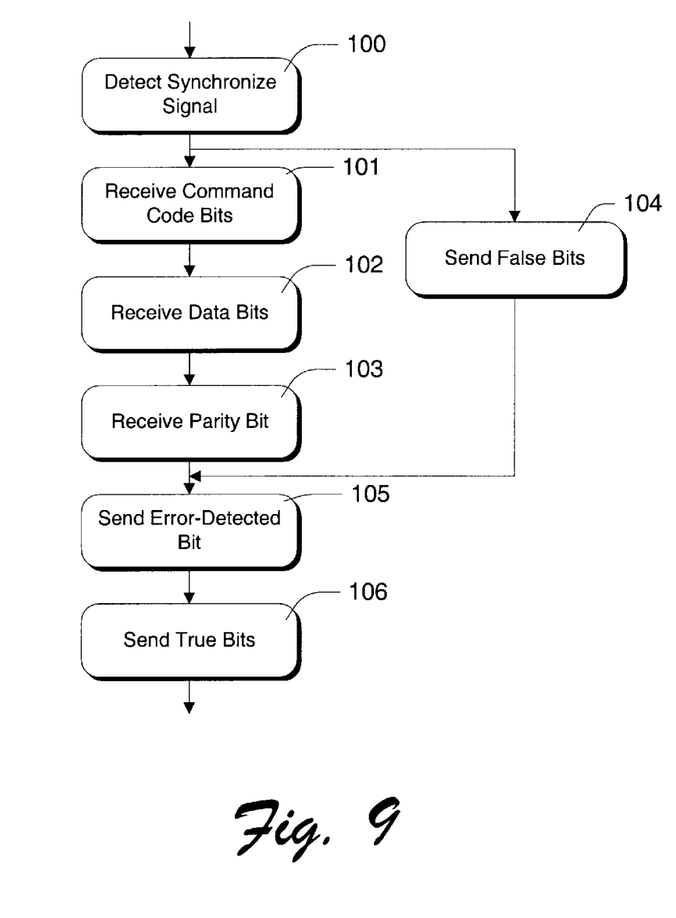
FIG. 9 is a flowchart showing steps performed by a faceplate during a write command.

FIG. 9 shows steps performed by the faceplate during the write protocol. A step 100 comprises detecting a synchronize signal on the synchronize line, indicating the beginning of a command sequence. In response to the synchronize signal, the faceplate performs a step 101 of detecting or receiving a sequence of command code bits on the serial receive line, and a subsequent step 102 of detecting or receiving a sequence of data bits on the serial receive line. Following step 103 comprises detecting or receiving a parity bit on the serial receive line. Step 104 comprises sending false bits on the serial transmit line during steps 101–103. Step 105 comprises sending the error-detected bit on the serial transmit line, indicating whether there was an error receiving the command code bits or the data bits. Step 106 comprises sending one or more logical true bits on the serial transmit line after the data transaction has been completed.

Figure 10:
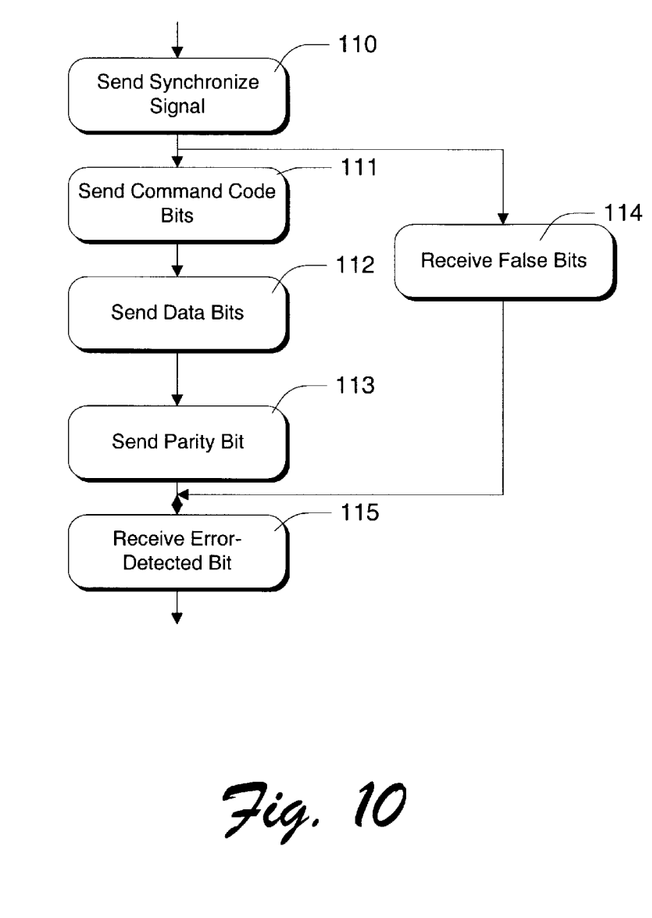
FIG. 10 is a flowchart showing steps performed by a base module during a write command.

FIG. 10 illustrates the same steps from the perspective of base module 22 during the write protocol. A step 110 comprises sending a synchronize signal. Subsequent step 111 comprises sending a sequence of command code bits on the serial receive line. Step 112 comprises sending a sequence of data bits on the serial receive line. Step 113 comprises sending a parity bit on the serial receive line after sending the sequence of command code bits. Step 114 comprises receiving logical false bits on the serial transmit line during steps 111–113. Step 115 comprises receiving an error-detected bit on the serial transmit line, indicating whether there was an error receiving the command code bits or the data bits.

Figure 11:
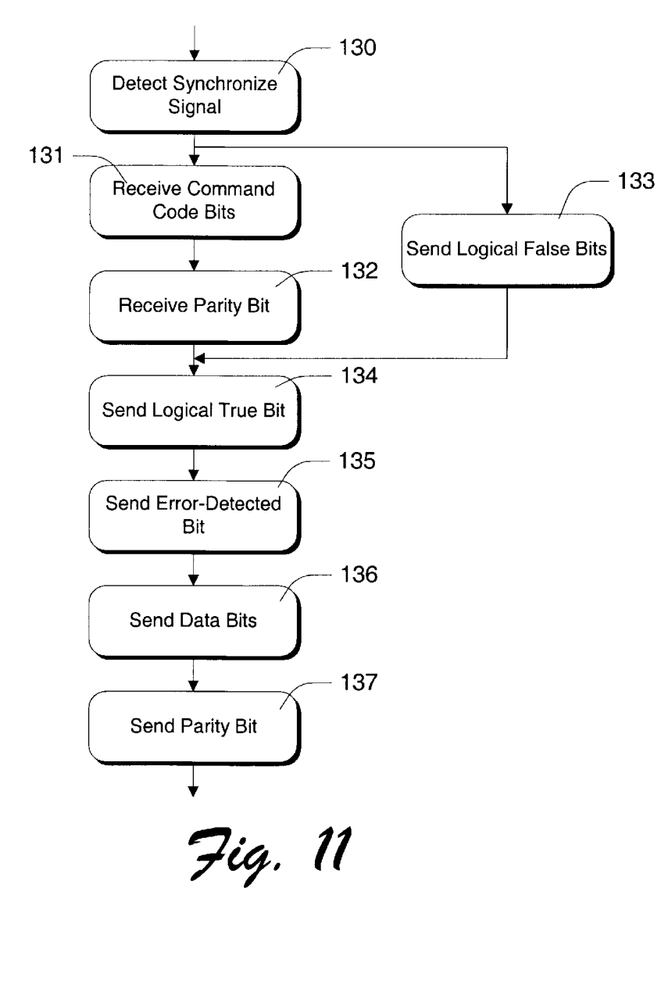
FIG. 11 is a flowchart showing steps performed by a faceplate during a read command.

FIG. 11 shows steps performed by the faceplate during the read protocol. A step 130 comprises detecting synchronize signal on the synchronize line. In response to the synchronize signal, the faceplate performs a step 131 of detecting or receiving a sequence of command code bits on the serial receive line. Step 132 comprises detecting or receiving a parity bit on the serial receive line after receiving the sequence of command code bits. Step 133 comprises sending logical false bits on the serial transmit line while detecting the sequence of command code bits. A step 134 comprises sending a logical true bit on the serial transmit line indicating that read data will follow. Step 135 comprises sending an error detected bit on the serial transmit line after sending the logical true bit. The error detected bit indicates whether there was an error receiving the command code bits. Following step 136 comprises sending a sequence of read data bits (D0–D7) on the serial transmit line in response to a command specified by the command code bits. Step 137 comprises sending a parity bit corresponding to the data bits sent on the serial transmit line after sending the sequence of read data bits.

Figure 12:
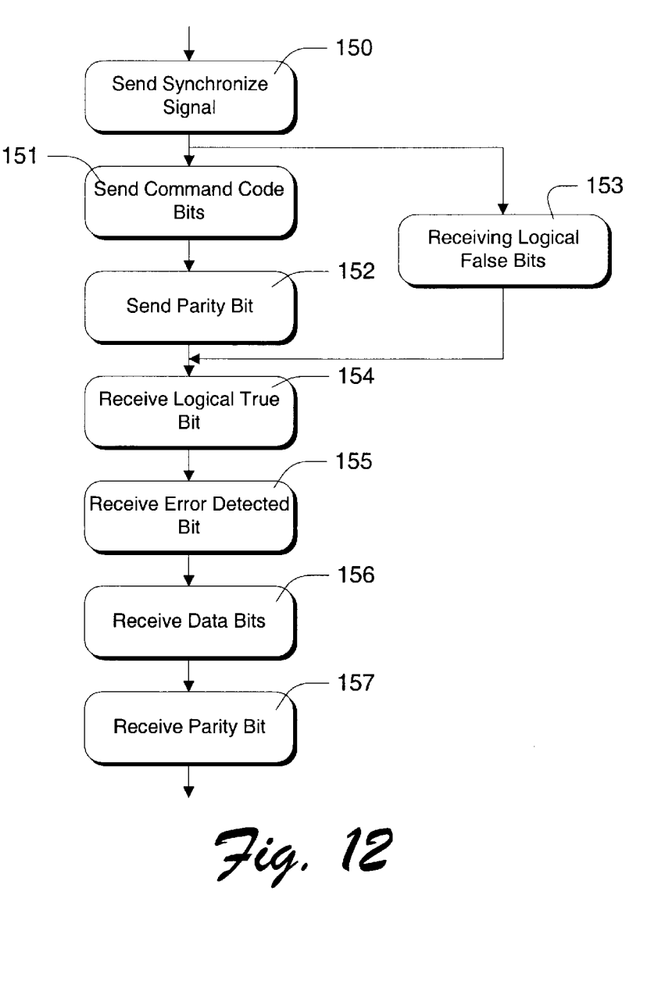
FIG. 12 is a flowchart showing steps performed by a base module during a read command.

FIG. 12 shows steps performed by the base module during the read protocol. A step 150 comprises sending synchronize signal on the synchronize line. Subsequent step 151 comprises sending a sequence of command code bits on the serial receive line. Step 152 comprises sending a parity bit on the serial receive line after sending the sequence of command code bits. Step 153 comprises receiving logical false bits on the serial transmit line while sending the sequence of command code bits and while sending the parity bit. Step 154 comprises detecting a logical true bit on the serial transmit line indicating that read data will follow from the detachable faceplate. Step 155 comprises receiving an error detected bit on the serial transmit line after detecting the logical true bit, the error detected bit indicating whether there was an error receiving the command code bits. Step 156 comprises detecting or receiving a sequence of read data bits on the serial transmit line. Step 157 comprises receiving a parity bit, which corresponds to the received data, on the serial transmit line after receiving the sequence of read data bits.

Faceplate FPGA Logic

Figure 13:
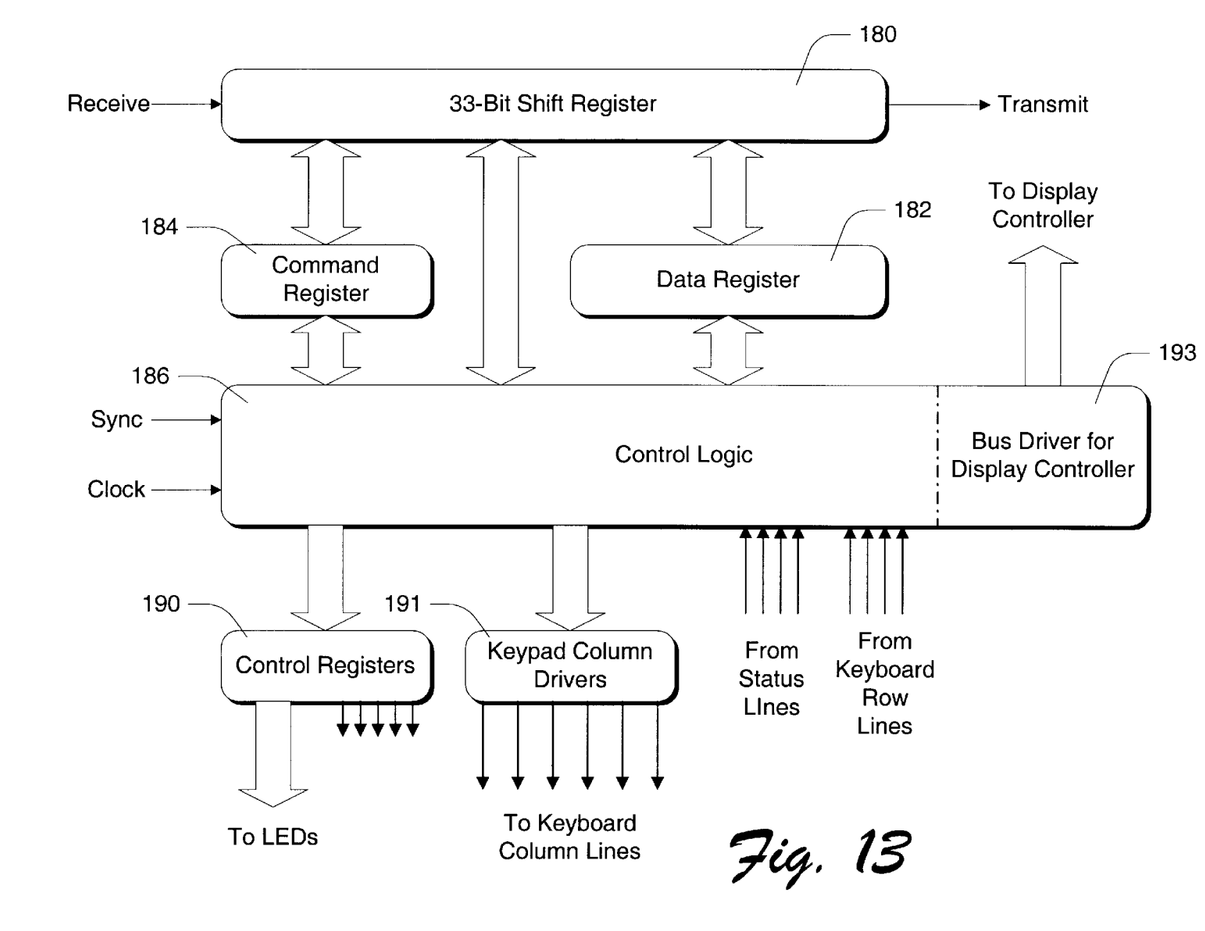
FIG. 13 is a functional block diagram showing functions implemented by logic within the faceplate shown in FIGS. 1 and 3.

FIG. 13 shows the primary functions implemented by faceplate FPGA logic 58. FPGA logic 58 has one or more buffers that store control messages as they are being received from the base module. Specifically, a 33-bit shift buffer or register 180 is connected to receive serial bit data from the serial receive line and to serial shift data bits out to serial transmit line. Having a size of 33 bits allows the shift register to simultaneously contain an 8-bit command control code, a 24-bit data word, and a single parity bit-in accordance with the control message protocol described above.

Faceplate logic 58 further includes a plurality of secondary registers for double buffering of command control codes and data words. The secondary registers include a data register 182 and a command register 184. The data register is 24 bits wide. The command register is 8 bits wide. A particular control message is transferred to the secondary registers as soon as it is completely received by shift register 180, so that a second control message can be received by and stored in the shift register while the first control message is being processed. Maximum benefit is obtained from the double buffering when writing pixel data to the LCD module; this is because the data bits have to be decompressed and the proper bus cycles have to be generated in order to communicate with the LCD module. Significant bandwidth improvement is realized by allowing the serial communication with the base module and the LCD pixel data processing to occur in parallel. Thus, the faceplate logic is configured to receive control messages from the base module through data interface 63, to transfer a first control message from shift register 180 to secondary registers 182 and 184 as soon as the control message has been received, and to process the first control message from secondary registers 182 and 184 at the same time as a second control message is being received in shift register 180.

Faceplate logic 58 further includes control logic 186 that coordinates data transfer functions between shift register 180, data register 182, command register 184, display controller 55, keypad 32, and status LEDs 60. Generally, control logic 186 is responsive to commands latched into command register 184 to perform various control functions and to prepare read data for transmission back to base module 22. Control logic 186 is connected to write to a set of control registers 190 and to keypad column drivers 191. Control logic 186 is also connected to read from keypad row scan lines and from other status lines such as power supply sensing lines. In addition, control logic 186 is connected to provide data to shift register 180 for eventual transmission to base module 22.

More specifically, control logic 186 is connected to receive synchronize line 66 and clock line 67 from base module 22. The signals produced by these lines are used by control logic 186 to clock shift register 180 at appropriate times and to thereby latch incoming bits from serial receive line 65. Control logic 186 also clocks data register 182 and command register 184 immediately after a full control message has been received from base module 22. In the case of a read command, a full control message consists of 8 bits followed by a single parity bit. The faceplate logic then compared this parity bit with a computed parity bit to determine if there are any errors in the received data. The response data sent from the faceplate also consists of 8 data bits followed immediately by a parity bit as shown in FIG. 8.

Commands

Control logic 186 is configured to respond to a plurality of different commands from base module 22. Each command is designated by a different command control code. Specifically, control logic 186 is responsive to the following commands to provide the indicated responses:

| Command | Response |
| --- | --- |
| Status Read | Returns faceplate status data to the base module. |
| Keypad Row Read | Returns keypad row data to the base module. |
| Version Read | Read faceplate version number. |
| Display Controller Read | Returns display controller data to the base module. |
| Keypad Column Write | Writes to the keypad column drivers |

| Command | Response |
| --- | --- |
| Control Register Write | Writes specified data to a faceplate control register. |
| Display Controller Write | Writes specified data to the display controller. |
| Address Write | Writes a specified pixel address to the display controller. |
| Pixel Write | Writes specified pixel data to the display controller. |

The command protocol described above is very flexible, and therefore allows a great variety of commands to be implemented by control logic 186 in response to commands received over the serial interface. Accordingly, a number of additional commands (in addition to those listed) can be easily implemented. For example, commands can be implemented for transferring data using infrared transmission and reception components if the faceplate is equipped with such components.

Pixel data is written from the base module using the address write command and the pixel write command. The address write command establishes a beginning address in the bit-mapped memory of the display controller for subsequent pixel write commands. Subsequent pixel write commands write pixel data to sequentially incremented addresses in the bit-mapped pixel memory, starting at the established beginning address. The faceplate control logic maintains a counter for this purpose that is automatically incremented after each pixel write command.

Even though the display controller is capable of utilizing four shades for each color component, the faceplate in the described embodiment of the invention is configured to operate display panel 54 with only two shades per color component (on and off). In addition, pixel data is specified within the pixel write command by compressed three-bit pixel words rather than the uncompressed six-bit pixel words expected by the display controller itself: each three-bit pixel word has one bit per each color component. Since the pixel write command has 24 data bits, eight pixel words are specified in each pixel write command.

The format of the address write command is as follows: the first eight bits (C0–C7) specify the command control code for the address write command. The next 16 bits (D0–D15) specify a 16-bit address in the bit-mapped memory used by the display controller, and the next 8 bits (D15–D23) are "don't cares". The format of the pixel write command is as follows: the first eight bits (C0–C7) specify the command control code for the address write command. The next 24 bits (D0–D23) specify eight sequential 3-bit pixel values. Each 3-bit pixel value is compressed relative to the uncompressed 6-bit pixel intensity words expected by display controller 55. Accordingly, control logic 186 expands the 3-bit values to six bits before creating the byte write bus cycles to write them to the display controller—the three bytes contained in a pixel write command are expanded to six bytes before they are written to display controller 55.

Keypad data is obtained by the base module through the use of the keypad row read command in conjunction with the keypad column write command. The keypad column write command allows the base module to drive individual keypad column lines, and the keypad row read command allows the base module to detect which row lines are activated. In an alternative embodiment of the invention, faceplate logic performs all keypad scanning and returns key codes to the base module to indicate which keys have been pressed.

Display Controller Driver

One significant responsibility of faceplate logic 58 and of its control logic 186 is to transfer data to and from display controller 55. This involves translating serial-bit-formatted data provided from base module 22 to a bit-parallel format that is appropriate for display controller 55. A typical off-the-shelf display controller transfers data using a parallel data bus and bus protocol that is particular to that display controller—the display controller expects pixel data and other data in a specific, predefined bus format. To communicate with such a display controller, control logic 186 has a bus driver 193 that is configured specifically for the display controller used in faceplate 24, to provide data to the display controller in the predefined bus format expected by the display controller. This potentially involves creating a plurality of bus cycles, depending on the exact nature of the display controller. In the embodiment described herein, the bus driver creates six bus cycles for every pixel write command, corresponding to the six bytes that are expanded from the original three bytes specified in the pixel write command. These functions are performed with respect to a given control message simultaneously with receiving a following control message. This makes it possible to transfer pixel data at a much higher rate than would otherwise be possible.

Conclusion

The invention facilitates the use of a medium-resolution color graphics display on a detachable faceplate without requiring a sophisticated parallel interface. Specifically, the invention utilizes a synchronous serial interface having a clock rate of only 7.5 MHz to achieve display refresh rates of at least 70 Hz.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A faceplate that is detachable from a base module of an in-dash automotive accessory, the faceplate comprising:
    a graphical display element having an array of at least 10,000 selectable pixels;
    a data interface connected to receive pixel data in a serial-bit format from the base module.

2. A detachable faceplate as recited in claim 1, wherein the array of pixels has a size of at least 64 by 256 pixels.

3. A detachable faceplate as recited in claim 1, further comprising faceplate logic that receives control messages from the base module through the data interface, the faceplate logic being configured to process a first control message at the same time as it receives a second control message.

4. A detachable faceplate as recited in claim 1, further comprising:
    a display controller associated with the graphical display element, wherein the display controller expects pixel data in a predefined format;
    wherein the faceplate has internal logic that translates the serial-bit-formatted pixel data to the predefined format expected by the display controller.

5. A detachable faceplate as recited in claim 1, further comprising:
a display controller associated with the graphical display element, wherein the display controller expects pixel data in a predefined bit-parallel format;
wherein the faceplate has internal logic that translates the serial-bit-formatted pixel data to the predefined bit-parallel format expected by the display controller.

6. A detachable faceplate as recited in claim 1, further comprising:
a display controller associated with the graphical display element, wherein the display controller expects pixel data in a predefined format that includes uncompressed pixel intensity words;
wherein the serial-bit format includes compressed pixel intensity words that are compressed relative to the uncompressed pixel intensity words.

7. A detachable faceplate as recited in claim 1, further comprising:
faceplate logic that receives control messages from the base module through the data interface;
the faceplate logic having one or more buffers that store a first control message as it is being received from the base module;
the faceplate logic having one or more registers that store the first control message while a second control message is received and stored in the one or more buffers;
the faceplate logic being configured to process the first control message while receiving the second control message.

8. A detachable faceplate as recited in claim 1, further comprising:
a display controller associated with the graphical display element;
faceplate logic that receives control messages from the base module through the data interface;
the faceplate logic having one or more buffers that store a first control message as it is being received from the base module;
the faceplate logic having one or more registers that store the first control message while a second control message is received and stored in the one or more buffers;
the faceplate logic being configured to write data from the first control message to the display controller while receiving the second control message.

9. A detachable faceplate as recited in claim 1, further comprising:
a display controller associated with the graphical display element;
faceplate logic that generates bus cycles to the display controller in response to receiving pixel data from the base module.

10. A detachable faceplate as recited in claim 1, further comprising:
a display controller associated with the graphical display element;
faceplate logic that translates the serial-bit-formatted pixel data to a predefined format expected by the display controller;
a matrix keypad;
wherein the faceplate logic sends keypad data to the base module in the serial-bit format.

11. An automotive accessory for use in a dashboard of a vehicle, comprising:
a base module that mounts in the dashboard;
a detachable faceplate as recited in claim 1.

12. A detachable faceplate as recited in claim 1, further comprising:
a keypad;
a display controller associated with the graphical display element;
a faceplate control register;
faceplate logic that is responsive to commands from the base module;
the faceplate logic being response to a status read command to return faceplate status data to the base module;
the faceplate logic being responsive to a keypad read command to return keypad data to the base module;
the faceplate logic being responsive to a display controller read command to return display controller data to the base module;
the faceplate logic being responsive to a control register write command to write faceplate control register data;
the faceplate logic being responsive to a display controller write command to write display controller data;
the faceplate logic being responsive to an address write command to write address data to the display controller;
the faceplate logic being responsive to a pixel write command to write pixel data to the display controller.

13. A detachable faceplate as recited in claim 1, further comprising:
bit-mapped pixel memory associated with the graphical display element;
faceplate logic that is responsive to commands from the base module;
the faceplate logic being responsive to an address write command and a pixel write command to write pixel data to the bit-mapped pixel memory, wherein the address write command establishes a beginning address for subsequent pixel write commands, and wherein the subsequent pixel write commands write pixel data to sequential addresses in the bit-mapped pixel memory starting at the established beginning address.

14. A detachable faceplate as recited in claim 1, wherein:
the data interface comprises:
a serial receive line;
a serial transmit line;
a synchronize line;
the detachable faceplate further comprising faceplate logic that is responsive to write messages received from the base module;
wherein the faceplate logic is configured to perform the following steps to receive a write message;
detecting a synchronize signal on the synchronize line;
in response to the synchronize signal on the synchronize line, detecting a sequence of command code bits on the serial receive line;
after detecting the sequence of command code bits, detecting a sequence of data bits on the serial receive line;
sending logical false bits on the serial transmit line while detecting the sequence of command code bits and the sequence of data bits;
sending one or more logical true bits on the serial transmit line after detecting the sequence of data bits.

15. A detachable faceplate as recited in claim 1, wherein:
the data interface comprises:
a serial receive line;
a serial transmit line;
a synchronize line;
the detachable faceplate further comprising faceplate logic that is responsive to write messages received from the base module;

wherein the faceplate logic is configured to perform the following steps to receive a write message;
  detecting a synchronize signal on the synchronize line;
  in response to the synchronize signal on the synchronize line, detecting a sequence of command code bits on the serial receive line;
  after detecting the sequence of command code bits, detecting a sequence of data bits on the serial receive line;
  sending logical false bits on the serial transmit line while detecting the sequence of command code bits and the sequence of data bits;
  detecting a parity bit on the serial receive line;
  sending one or more logical true bits on the serial transmit line after detecting the parity bit;
  sending an error-detected bit on the serial transmit line that indicates whether there was an error receiving the command code bits or the data bits.

16. A detachable faceplate as recited in claim 1, wherein:
the data interface comprises:
  a serial receive line;
  a serial transmit line;
  a synchronize line;
the detachable faceplate further comprising faceplate logic that is responsive to read messages received from the base module;
wherein the faceplate logic is configured to perform the following steps to receive and respond to a read message;
  detecting a synchronize signal on the synchronize line;
  in response to the synchronize signal on the synchronize line, detecting a sequence of command code bits on the serial receive line;
  sending logical false bits on the serial transmit line while detecting the sequence of command code bits;
  sending a logical true bit on the serial transmit line indicating that read data will follow;
  sending a sequence of read data bits on the serial transmit line.

17. A detachable faceplate as recited in claim 1, wherein:
the data interface comprises:
  a serial receive line;
  a serial transmit line;
  a synchronize line;
the detachable faceplate further comprising faceplate logic that is responsive to read messages received from the base module;
wherein the faceplate logic is configured to perform the following steps to receive and respond to a read message;
  detecting a synchronize signal on the synchronize line;
  in response to the synchronize signal on the synchronize line, detecting a sequence of command code bits on the serial receive line;
  detecting a parity bit on the serial receive line;
  sending logical false bits on the serial transmit line while detecting the sequence of command code bits;
  sending a logical true bit on the serial transmit line indicating that read data will follow;
  sending an error-detected bit on the serial transmit line that indicates whether there was an error receiving the command code bits;
  sending a sequence of read data bits on the serial transmit line;
  sending a parity bit on the serial transmit line.

18. A detachable faceplate as recited in claim 1, wherein:
the data interface comprises:
  a serial receive line;
  a serial transmit line;
  a synchronize line;
the detachable faceplate further comprising faceplate logic that is responsive to write and read messages received from the base module;
wherein the faceplate logic is configured to perform the following steps to receive a write message;
  detecting a synchronize signal on the synchronize line;
  in response to the synchronize signal on the synchronize line, detecting a sequence of command code bits on the serial receive line;
  after detecting the sequence of command code bits, detecting a sequence of data bits on the serial receive line;
  sending logical false bits on the serial transmit line while detecting the sequence of command code bits and the sequence of data bits;
  detecting a parity bit on the serial receive line;
  sending one or more logical true bits on the serial transmit line after detecting the parity bit;
  sending an error-detected bit on the serial transmit line that indicates whether there was an error receiving the command code bits or the data bits;
wherein the faceplate logic is configured to perform the following steps to receive and respond to a read message;
  detecting a synchronize signal on the synchronize line;
  in response to the synchronize signal on the synchronize line, detecting a sequence of command code bits on the serial receive line;
  detecting a parity bit on the serial receive line;
  sending logical false bits on the serial transmit line while detecting the sequence of command code bits;
  sending a logical true bit on the serial transmit line indicating that read data will follow;
  sending an error-detected bit on the serial transmit line that indicates whether there was an error receiving the command code bits;
  sending a sequence of read data bits on the serial transmit line;
  sending a parity bit on the serial transmit line.

19. A detachable faceplate as recited in claim 1, further comprising:
  a keypad;
  a display controller associated with the graphical display element;
  a faceplate control register;
  faceplate logic that is responsive to write and read messages received from the base module;
wherein the data interface comprises:
  a serial receive line;
  a serial transmit line;
  a synchronize line;
wherein the faceplate logic is configured to perform the following steps to receive a write message;
  detecting a synchronize signal on the synchronize line;
  in response to the synchronize signal on the synchronize line, detecting a sequence of command code bits on the serial receive line;
  after detecting the sequence of command code bits, detecting a sequence of data bits on the serial receive line;

sending logical false bits on the serial transmit line while detecting the sequence of command code bits and the sequence of data bits;

detecting a parity bit on the serial receive line;

sending one or more logical true bits on the serial transmit line after detecting the parity bit;

sending an error-detected bit on the serial transmit line that indicates whether there was an error receiving the command code bits or the data bits;

wherein the faceplate logic is configured to perform the following steps to receive and respond to a read message;

detecting a synchronize signal on the synchronize line;

in response to the synchronize signal on the synchronize line, detecting a sequence of command code bits on the serial receive line;

detecting a parity bit on the serial receive line;

sending logical false bits on the serial transmit line while detecting the sequence of command code bits;

sending a logical true bit on the serial transmit line indicating that read data will follow;

sending an error-detected bit on the serial transmit line that indicates whether there was an error receiving the command code bits;

sending a sequence of read data bits on the serial transmit line;

sending a parity bit on the serial transmit line. wherein the command code bits define at least the following commands:

a status read command;
a keypad read command;
a display controller read command;
a control register write command;
a display controller write command;
an address write command;
a pixel write command.

20. A detachable faceplate as recited in claim 1, further comprising:

a matrix keypad;

bit-mapped pixel memory associated with the graphical display element;

a display controller associated with the graphical display element, wherein the display controller expects pixel data in a predefined format that includes uncompressed pixel intensity words, wherein the serial-bit format includes compressed pixel intensity words that are compressed relative to the uncompressed pixel intensity words;

faceplate logic that translates the serial-bit-formatted pixel data to the predefined format expected by the display controller;

wherein the faceplate logic sends keypad data to the base module in the serial-bit format;

a faceplate control register;

the faceplate logic being responsive to write and read messages received from the base module;

wherein the data interface comprises:
a serial receive line;
a serial transmit line;
a synchronize line;

wherein the faceplate logic is configured to perform the following steps to receive a write message;

detecting a synchronize signal on the synchronize line;

in response to the synchronize signal on the synchronize line, detecting a sequence of command code bits on the serial receive line;

after detecting the sequence of command code bits, detecting a sequence of data bits on the serial receive line;

sending logical false bits on the serial transmit line while detecting the sequence of command code bits and the sequence of data bits;

detecting a parity bit on the serial receive line;

sending one or more logical true bits on the serial transmit line after detecting the parity bit;

sending an error-detected bit on the serial transmit line that indicates whether there was an error receiving the command code bits or the data bits;

wherein the faceplate logic is configured to perform the following steps to receive and respond to a read message;

detecting a synchronize signal on the synchronize line;

in response to the synchronize signal on the synchronize line, detecting a sequence of command code bits on the serial receive line;

detecting a parity bit on the serial receive line;

sending logical false bits on the serial transmit line while detecting the sequence of command code bits;

sending a logical true bit on the serial transmit line indicating that read data will follow;

sending an error-detected bit on the serial transmit line that indicates whether there was an error receiving the command code bits;

sending a sequence of read data bits on the serial transmit line;

sending a parity bit on the serial transmit line.

wherein the command code bits define at least the following commands:
a status read command;
a keypad read command;
a display controller read command;
a control register write command;
a display controller write command;
an address write command;
a pixel write command;

the faceplate logic being responsive to the address write command and the pixel write command to write pixel data to the bit-mapped pixel memory, wherein the address write command establishes a beginning address for subsequent pixel write commands, and wherein the subsequent pixel write commands write pixel data to sequential addresses in the bit-mapped pixel memory starting at the established beginning address.

21. A method of receiving pixel data in a detachable faceplate of an in-dash automotive accessory, the faceplate having a graphical display element with an array of individually addressable pixels and having a data interface with a serial receive line, a serial transmit line, and a synchronize line, the method comprising the following steps:

detecting a synchronize signal on the synchronize line;

in response to the synchronize signal on the synchronize line, detecting a sequence of command code bits on the serial receive line;

after detecting the sequence of command code bits, detecting a sequence of data bits on the serial receive line;

sending logical false bits on the serial transmit line while detecting the sequence of command code bits and the sequence of data bits;

sending one or more logical true bits on the serial transmit line after detecting the sequence of data bits.

22. A method as recited in claim 21, comprising the following additional steps:
  detecting a parity bit on the serial receive line after detecting the sequence of command code bits;
  sending an error-detected bit on the serial transmit line that indicates whether there was an error receiving the command code bits or the data bits.

23. A method of sending pixel data to a detachable faceplate of an in-dash automotive accessory, the faceplate having a graphical display element with an array of individually addressable pixels and having a data interface with a serial receive line, a serial transmit line, and a synchronize line, the method comprising the following steps:
  sending a synchronize signal on the synchronize line;
  sending a sequence of command code bits on the serial receive line;
  sending a sequence of data bits on the serial receive line;
  receiving logical false bits on the serial transmit line while sending the sequence of command code bits and the sequence of data bits;
  sending a parity bit on the serial receive line after sending the sequence of command code bits;
  receiving an error-detected bit on the serial transmit line that indicates whether there was an error receiving the command code bits or the data bits.

24. A method of receiving and responding to commands in a detachable faceplate of an in-dash automotive accessory, the faceplate having a graphical display element with an array of individually addressable pixels and having a data interface with a serial receive line, a serial transmit line, and a synchronize line, the method comprising the following steps:
  detecting a synchronize signal on the synchronize line;
  in response to the synchronize signal on the synchronize line, detecting a sequence of command code bits on the serial receive line;
  sending logical false bits on the serial transmit line while detecting the sequence of command code bits;
  sending a logical true bit on the serial transmit line indicating that read data will follow;
  sending a sequence of read data bits on the serial transmit line in response to a command specified by the command code bits.

25. A method as recited in claim 24, comprising the following additional steps:
  detecting a parity bit on the serial receive line after detecting the sequence of command code bits;
  sending an error detected bit on the serial transmit line after sending the logical true bit, the error detected bit indicating whether there was an error receiving the command code bits;
  sending a parity bit on the serial transmit line after sending the sequence of read data bits.

26. A method of sending commands to and receiving responses from a detachable faceplate of an in-dash automotive accessory, the faceplate having a graphical display element with an array of individually addressable pixels and having a data interface with a serial receive line, a serial transmit line, and a synchronize line, the method comprising the following steps:
  sending a synchronize signal on the synchronize line;
  sending a sequence of command code bits on the serial receive line;
  receiving logical false bits on the serial transmit line while sending the sequence of command code bits;
  detecting a logical true bit on the serial transmit line indicating that read data will follow from the detachable faceplate;
  detecting a sequence of read data bits on the serial transmit line.

27. A method as recited in claim 26, comprising the following additional steps:
  sending a parity bit on the serial receive line after sending the sequence of command code bits;
  receiving an error detected bit on the serial transmit line after detecting the logical true bit, the error detected bit indicating whether there was an error receiving the command code bits;
  receiving a parity bit on the serial transmit line after detecting the sequence of read data bits.

28. A faceplate that is detachable from a base module of an in-dash automotive accessory, the faceplate comprising:
  a graphical display element having an array of individually selectable pixels;
  a display controller associated with the graphical display element;
  a data interface connected to receive commands from the base module and to send data to the base module;
  a keypad;
  a faceplate control register;
  faceplate logic that is responsive to commands from the base module;
  the faceplate logic being response to a status read command to return faceplate status data to the base module;
  the faceplate logic being responsive to a keypad read command to return keypad data to the base module;
  the faceplate logic being responsive to a display controller read command to return display controller data to the base module;
  the faceplate logic being responsive to a control register write command to write faceplate control register data;
  the faceplate logic being responsive to a display controller write command to write display controller data;
  the faceplate logic being responsive to an address write command to write address data to the display controller;
  the faceplate logic being responsive to a pixel write command to write pixel data to the display controller.

29. In an in-dash automotive accessory having a base module and a detachable faceplate, the faceplate having a graphical display element with an array of at least 10,000 individually selectable pixels, a method of communicating between the base module and the faceplate, the method comprising the following steps:
  sending control messages from the base module to the detachable faceplate in a serial-bit format, the control messages containing pixel intensity words;
  receiving the control messages at the faceplate;
  translating the pixel intensity words to a bit-parallel format that is expected by a display controller associated with the graphical display element.

30. A method as recited in claim 29, wherein the pixel intensity words in the control messages are compressed, the translating step comprising uncompressing the pixel intensity words.

31. A method as recited in claim 29, wherein the translating step is performed concurrently with the receiving step.

32. A method as recited in claim 29, wherein the translating step includes creating bus cycles appropriate for the display controller.

33. A method as recited in claim 29, wherein:

the receiving step comprises storing a first control message in one or more buffers as it is received;

the method farther comprises a step of storing the first control message in one or more registers while performing the translating step and while receiving a second control message.

34. A method as recited in claim 29, wherein the faceplate has a keypad, a faceplate control register, and a display controller, the method comprising the following additional steps:

returning faceplate status data to the base module in response to a status read command;

returning keypad data to the base module in response to a keypad read command;

returning display controller data to the base module in response to a display controller read command;

writing faceplate control register data in response to a control register write command;

writing display controller data in response to a display controller write command;

writing address data to the display controller in response to an address write command;

writing pixel data to the display controller in response to a pixel write command.

35. A method as recited in claim 29, wherein the faceplate has bit-mapped pixel memory associated with the graphical display element, the method comprising the following additional step:

writing data to the bit-mapped pixel memory in response to an address write command and a pixel write command from the base module, wherein the address write command establishes a beginning address for subsequent pixel write commands, and wherein the subsequent pixel write commands write pixel data to sequential addresses in the bit-mapped pixel memory starting at the established beginning address.

36. A method as recited in claim 29, wherein the faceplate has a data interface with a serial receive line, a serial transmit line, and a synchronize line, the method further comprising the following additional steps:

sending a synchronize signal on the synchronize line from the base module;

sending a sequence of command code bits on the serial receive line from the base module;

sending a sequence of data bits on the serial receive line from the base module;

sending a parity bit on the serial receive line from the base module;

detecting the synchronize signal on the synchronize line at the faceplate;

in response to the synchronize signal on the synchronize line, detecting the sequence of command code bits and the sequence of data bits on the serial receive line at the faceplate;

sending logical false bits on the serial transmit line from the faceplate while detecting the sequence of command code bits and the sequence of data bits;

detecting the parity bit on the serial receive line at the faceplate after detecting the sequence of data bits;

sending one or more logical true bits on the serial transmit line from the faceplate after detecting the parity bit;

sending an error-detected bit on the serial transmit line from the faceplate to indicate whether there was an error receiving the command code bits or the data bits.

37. A method as recited in claim 29, wherein the faceplate has a data interface with a serial receive line, a serial transmit line, and a synchronize line, the method further comprising the following additional steps:

sending a synchronize signal on the synchronize line from the base module;

sending a sequence of command code bits on the serial receive line from the base module;

sending a parity bit on the serial receive line from the base module;

detecting the synchronize signal on the synchronize line at the faceplate;

in response to the synchronize signal on the synchronize line, detecting the sequence of command code bits at the faceplate;

sending logical false bits on the serial transmit line from the faceplate while detecting the sequence of command code bits;

sending a logical true bit on the serial transmit line from the faceplate indicating that read data will follow;

sending an error detected bit on the serial transmit line from the faceplate after sending the logical true bit, the error detected bit indicating whether there was an error receiving the command code bits;

sending a sequence of read data bits on the serial transmit line from the faceplate;

sending a parity bit on the serial transmit line after sending the sequence of read data bits.

38. A method as recited in claim 29, wherein the faceplate has a data interface with a serial receive line, a serial transmit line, and a synchronize line, the method further comprising the following additional steps:

sending a synchronize signal on the synchronize line from the base module;

sending a sequence of command code bits on the serial receive line from the base module;

sending a parity bit on the serial receive line from the base module;

detecting the synchronize signal on the synchronize line at the faceplate;

in response to the synchronize signal on the synchronize line, detecting the sequence of command code bits at the faceplate;

sending logical false bits on the serial transmit line from the faceplate while detecting the sequence of command code bits;

wherein the command code bits define commands comprising:

a status read command;

a keypad read command;

a display controller read command;

a control register write command;

a display controller write command;

an address write command;

a pixel write command.

* * * * *

UNITED STATES PATENT AND TRADEMARK OFFICE
CERTIFICATE OF CORRECTION

PATENT NO. : 6,131,051
DATED : October 10, 2000
INVENTOR(S) : Richard D. Beckert et al.

It is certified that error appears in the above-identified patent and that said Letters Patent is hereby corrected as shown below:

<u>Column 19,</u>
Line 4, change "farther" to -- further --.

Signed and Sealed this

Twenty-fifth Day of September, 2001

*Attest:*

*Attesting Officer*

NICHOLAS P. GODICI
*Acting Director of the United States Patent and Trademark Office*